(12) United States Patent
Nash et al.

(10) Patent No.: US 7,497,019 B2
(45) Date of Patent: Mar. 3, 2009

(54) LASER REFERENCE DEVICE

(75) Inventors: Derek J. Nash, Huntersville, NC (US); John Smith, Denver, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 11/497,991

(22) Filed: Aug. 2, 2006

(65) Prior Publication Data

US 2007/0028470 A1     Feb. 8, 2007

Related U.S. Application Data

(60) Provisional application No. 60/705,660, filed on Aug. 4, 2005.

(51) Int. Cl.
G01C 15/00     (2006.01)
G01C 15/12     (2006.01)

(52) U.S. Cl. ............................. 33/286; 33/283; 33/291; 33/DIG. 21

(58) Field of Classification Search .................. 33/1 T, 33/276, 277, 278, 279, 280, 282, 283, 286, 33/291, 292, DIG. 21; 356/615, 620, 622
See application file for complete search history.

(56) References Cited

U.S. PATENT DOCUMENTS

| | | | |
|---|---|---|---|
| 1,153,760 A | 9/1915 | Butler | |
| 3,628,874 A | 12/1971 | Tagnon et al. | |
| 3,820,903 A | 6/1974 | Kindl et al. | |
| 3,876,309 A | 4/1975 | Zicaro et al. | |
| 3,897,637 A | 8/1975 | Genho | |
| 3,964,824 A | 6/1976 | Dixon | |
| 4,031,629 A | 6/1977 | Paluck | |
| 4,111,564 A | 9/1978 | Trice, Jr. | |
| 4,221,483 A | 9/1980 | Rando | |
| 4,751,782 A | 6/1988 | Ammann | |
| 4,852,265 A | 8/1989 | Rando et al. | |
| 4,854,704 A | 8/1989 | Funazaki et al. | |
| 4,912,851 A | 4/1990 | Rando et al. | |
| 4,993,161 A | 2/1991 | Borkovitz | |
| 5,075,977 A | 12/1991 | Rando | |

(Continued)

FOREIGN PATENT DOCUMENTS

WO          9851994          11/1998

OTHER PUBLICATIONS

Black & Decker's Auto-Leveling Lasers, The Black & Decker Corporation, Copyright 2000-2004.

(Continued)

*Primary Examiner*—R. A. Smith
(74) *Attorney, Agent, or Firm*—Dennis J. Williamson; Moore & Van Allen, PLLC

(57) ABSTRACT

A chassis can be electro-mechanically rotated about an axis. The chassis contains a laser module and an inclination sensor. A laser beam and/or a laser line or plane can be emitted from chassis using a lens or reflector to focus the light in the desired beam or plane shape. The inclinometer/accelerometer senses the spatial orientation of the chassis and a microprocessor drives a motor through a motor control to adjust the angular orientation of the chassis. Preset angular orientations may be programmed into microprocessor that define predetermined angular orientations of the chassis.

19 Claims, 5 Drawing Sheets

U.S. PATENT DOCUMENTS

| | | | | |
|---|---|---|---|---|
| 5,108,177 A | * | 4/1992 | Middleton | 356/250 |
| 5,144,487 A | | 9/1992 | Hersey | |
| 5,208,438 A | | 5/1993 | Underberg | |
| 5,243,398 A | | 9/1993 | Nielsen | |
| 5,287,365 A | | 2/1994 | Nielsen et al. | |
| 5,287,627 A | | 2/1994 | Rando | |
| 5,335,244 A | | 8/1994 | Dugan et al. | |
| 5,367,779 A | | 11/1994 | Lee | |
| 5,394,616 A | | 3/1995 | Claxton | |
| 5,400,514 A | | 3/1995 | Imbrie et al. | |
| 5,459,932 A | | 10/1995 | Rando et al. | |
| 5,500,524 A | | 3/1996 | Rando | |
| 5,519,942 A | | 5/1996 | Webb | |
| 5,524,352 A | | 6/1996 | Rando et al. | |
| 5,531,031 A | | 7/1996 | Green | |
| 5,533,268 A | | 7/1996 | Keightley | |
| 5,539,990 A | | 7/1996 | Le | |
| 5,552,886 A | | 9/1996 | Kitajima et al. | |
| 5,617,202 A | | 4/1997 | Rando | |
| 5,617,645 A | | 4/1997 | Wick et al. | |
| 5,621,975 A | | 4/1997 | Rando | |
| 5,666,736 A | | 9/1997 | Wen | |
| 5,689,330 A | | 11/1997 | Gerard et al. | |
| 5,742,387 A | | 4/1998 | Ammann | |
| 5,754,582 A | | 5/1998 | Dong | |
| 5,782,003 A | | 7/1998 | Bozzo | |
| 5,819,424 A | | 10/1998 | Ohtomo et al. | |
| 5,836,081 A | | 11/1998 | Orosz, Jr. | |
| 5,838,431 A | | 11/1998 | Hara et al. | |
| 5,842,282 A | | 12/1998 | Ting | |
| 5,864,956 A | | 2/1999 | Dong | |
| 5,872,657 A | | 2/1999 | Rando | |
| 5,894,123 A | * | 4/1999 | Ohtomo et al. | 250/236 |
| 5,898,809 A | | 4/1999 | Taboada et al. | |
| 5,907,907 A | | 6/1999 | Ohtomo et al. | |
| 5,917,587 A | | 6/1999 | Rando | |
| 5,967,645 A | | 10/1999 | Anderson | |
| 5,983,510 A | | 11/1999 | Wu et al. | |
| 5,992,029 A | | 11/1999 | Dong | |
| 6,005,716 A | | 12/1999 | Ligtenberg et al. | |
| 6,005,719 A | | 12/1999 | Rando | |
| 6,009,630 A | | 1/2000 | Rando | |
| 6,012,229 A | | 1/2000 | Shiao | |
| 6,014,211 A | | 1/2000 | Middleton et al. | |
| 6,035,540 A | | 3/2000 | Wu et al. | |
| 6,037,874 A | | 3/2000 | Heironimus | |
| 6,043,870 A | | 3/2000 | Dong | |
| 6,065,217 A | | 5/2000 | Dong | |
| 6,069,748 A | | 5/2000 | Bietry | |
| 6,073,353 A | | 6/2000 | Ohtomo et al. | |
| 6,073,354 A | | 6/2000 | Rando | |
| 6,082,875 A | | 7/2000 | Kousek | |
| 6,087,645 A | | 7/2000 | Kitajima et al. | |
| 6,150,943 A | | 11/2000 | Lehman et al. | |
| 6,163,969 A | | 12/2000 | Jan et al. | |
| 6,167,630 B1 | | 1/2001 | Webb | |
| 6,202,312 B1 | | 3/2001 | Rando | |
| 6,256,895 B1 | | 7/2001 | Akers | |
| 6,314,651 B1 | * | 11/2001 | Ohtomo et al. | 33/290 |
| 6,351,890 B1 | | 3/2002 | Williams | |
| 6,360,446 B1 | | 3/2002 | Bijawat et al. | |
| 6,449,856 B1 | * | 9/2002 | Matsumoto et al. | 33/365 |
| 6,493,955 B1 | | 12/2002 | Moretti | |
| 6,502,319 B1 | | 1/2003 | Goodrich et al. | |
| 6,539,638 B1 | | 4/2003 | Pelletier | |
| 6,568,094 B2 | | 5/2003 | Wu | |
| 6,577,388 B2 | | 6/2003 | Kallabis | |
| 6,598,304 B2 | | 7/2003 | Akers | |
| 6,625,895 B2 | * | 9/2003 | Tacklind et al. | 33/286 |
| 6,675,489 B2 | | 1/2004 | Ohtomo et al. | |
| 6,679,609 B2 | | 1/2004 | Ohtomo et al. | |
| 6,688,011 B2 | | 2/2004 | Gamal et al. | |
| 6,710,929 B2 | | 3/2004 | Phuly et al. | |
| 6,722,048 B2 | | 4/2004 | Huang et al. | |
| 6,735,879 B2 | | 5/2004 | Malard et al. | |
| 6,754,969 B2 | | 6/2004 | Waibel | |
| 6,829,834 B1 | | 12/2004 | Krantz | |
| 6,842,291 B2 | | 1/2005 | Bergen | |
| 6,871,408 B2 | | 3/2005 | Malard et al. | |
| 6,914,930 B2 | | 7/2005 | Raskin et al. | |
| 6,935,034 B2 | | 8/2005 | Malard et al. | |
| 7,065,890 B1 | * | 6/2006 | Chang | 33/286 |
| 7,134,212 B2 | * | 11/2006 | Marshall et al. | 33/286 |
| 7,237,341 B2 | * | 7/2007 | Murray | 33/286 |
| 7,278,218 B2 | * | 10/2007 | Levine | 33/286 |
| 2002/0053144 A1 | * | 5/2002 | Matsumoto et al. | 33/283 |
| 2003/0231303 A1 | | 12/2003 | Raskin et al. | |
| 2004/0187327 A1 | | 9/2004 | Levine | |
| 2004/0216313 A1 | | 11/2004 | Marshall et al. | |
| 2005/0005462 A1 | | 1/2005 | Heger et al. | |
| 2005/0022399 A1 | | 2/2005 | Wheeler et al. | |
| 2005/0078303 A1 | * | 4/2005 | Murray | 356/138 |
| 2005/0155238 A1 | * | 7/2005 | Levine et al. | 33/286 |
| 2005/0278966 A1 | * | 12/2005 | Liu | 33/286 |
| 2006/0107539 A1 | * | 5/2006 | Gamal et al. | 33/290 |
| 2007/0000139 A1 | * | 1/2007 | Chen | 33/286 |
| 2007/0044332 A1 | * | 3/2007 | Yung et al. | 33/286 |
| 2007/0056173 A1 | * | 3/2007 | Burry et al. | 33/286 |
| 2007/0169359 A1 | * | 7/2007 | Lin | 33/286 |
| 2007/0175054 A1 | * | 8/2007 | Murray | 33/286 |
| 2008/0000095 A1 | * | 1/2008 | Spaulding et al. | 33/286 |

OTHER PUBLICATIONS

PLS Measuring and Alignment Tools.
Zircon iLine Automatic Laser Level, Zircon.

* cited by examiner

LASER REFERENCE DEVICE

This application claims the benefit of priority under 36 U.S.C. § 119(e) to the filing date of U.S. Provisional Application 60/705,660 filed on Aug. 24, 2005, which is incorporated herein by reference in its entirety.

The invention relates generally to laser reference devices and more particularly to a wall mounted laser reference device that electronically self-aligns accurately to multiple pre-selected or user selectable orientations.

BACKGROUND

Laser reference devices for creating a line of light on a surface are known and are typically used to orient objects on the surface. Such devices may be used on vertical and horizontal surfaces where the light is projected in a known orientation such that the projected line of light may be used as a reference line on the surface on which it is projected. Such devices may consist of a laser and lens assembly that project either a beam of light or a fan or plane of light. Where a beam of light is projected the beam is typically rotated in order to create the line on the surface. Where a fan or plane of light is projected, the plane of light is oriented to intersect the surface to create the line of light.

Devices for creating a reference line on a wall using bubble vials to manually level the device relative to the wall are known. Typically, the user manually orients the device on the surface using the bubble vial as a visual reference. Wall-mounted devices with lasers that self-level are also known. Typically, this is done with pendulums; however, a pendulum typically works in only one orientation. One device is known that uses a pendulum that can be oriented in multiple positions, but the positions are limited, pre-defined and not very accurate. Also known are laser devices that are not wall mounted and project lines with internal pendulums. These devices also typically work in only one orientation. One further category of devices that self-level is rotary lasers. These levels can electronically level in multiple orientations, however, they are typically not directly wall-mountable. Also, these levels depend on the rotary nature of the device to self-level.

SUMMARY OF THE INVENTION

One embodiment of the present invention comprises a chassis that can be electro-mechanically rotated about an axis. The chassis contains a laser module and an electronic inclinometer/accelerometer. A laser beam and/or a laser line or plane can be emitted from chassis using a lens or reflector to focus the light in the desired beam or plane shape. The inclinometer/accelerometer senses the spatial orientation of the chassis and a microprocessor drives a motor through a motor control to adjust the angular orientation of the chassis. Preset angular orientations may be programmed into microprocessor that define predetermined angular orientations of the chassis. The preset angles could be set at the factory or programmed by the user. The inclinometer/accelerometer electronically senses the actual angular orientation of the chassis. The microprocessor compares the sensed actual angular orientation to the desired preset angle and automatically rotates the chassis to the precise preset angle. In one embodiment, the chassis may be rotated to the preset angle closest to the sensed orientation. The device could also include a user input such as a keypad where the user can input information such as user selected preset angles, the desired final angular position of the laser or other user inputs to the microprocessor. A graphic display and LED lights may be used to provide information to the user.

DETAILED DESCRIPTION OF EMBODIMENTS OF THE INVENTION

Figure 1:
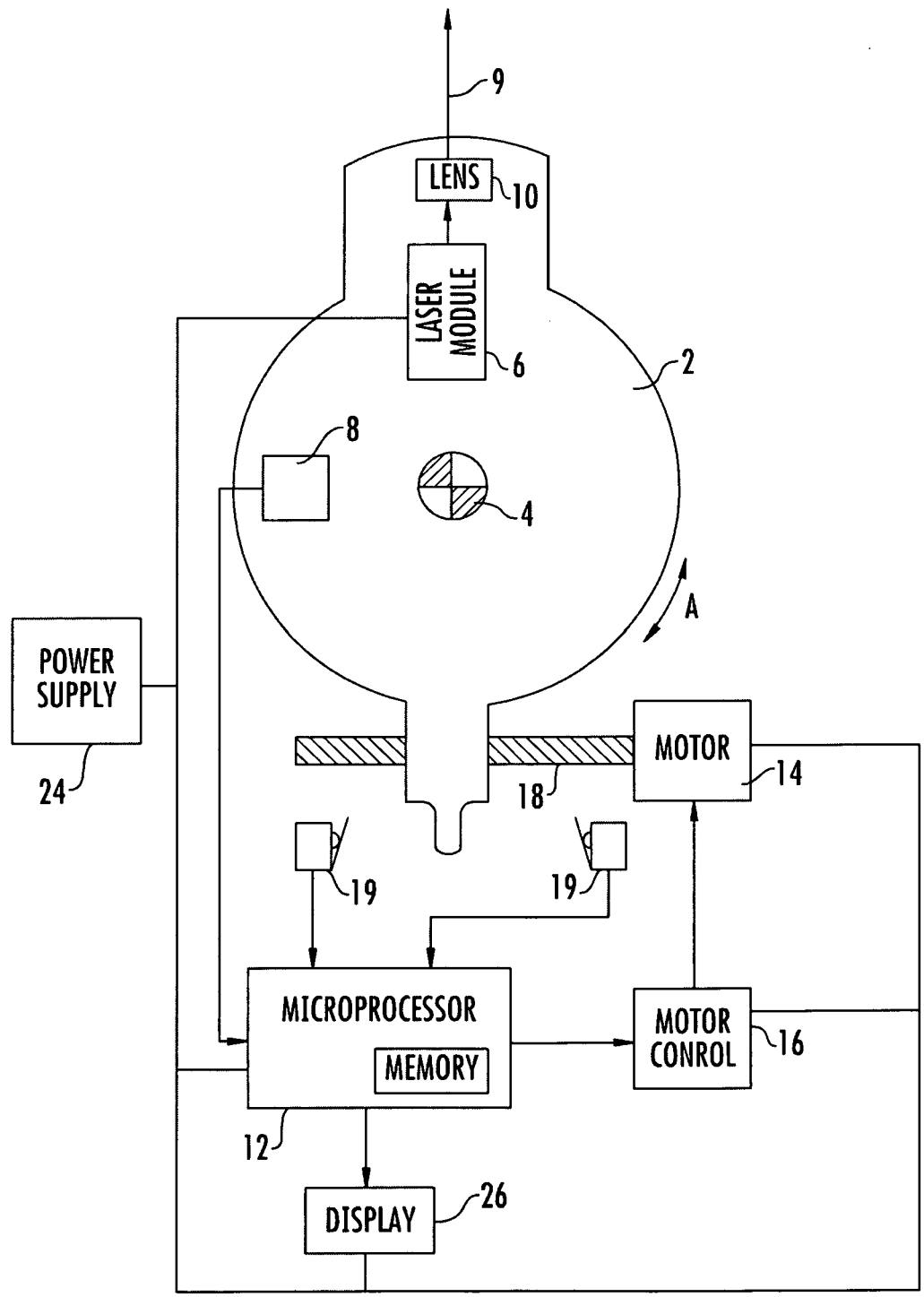
FIG. 1 is a schematic view of an embodiment of the laser reference device of the invention.

Referring to FIG. 1, the present invention comprises a chassis 2 that can be electro-mechanically rotated about axle 4. The chassis 2 contains a laser module 6 for generating a collimated beam of light, and an electronic inclination sensor such as an inclinometer/accelerometer 8. A laser beam and/or a laser line or plane 9 can be emitted from chassis 2 using a lens or reflector 10 to focus the light in the desired beam or plane shape. A beam of light projected from the device will be visible as a dot on a surface that the beam intersects. A plane or fan of light projected from the device will be visible as a line of light on a surface that the plane or fan intersects. In one embodiment the plane or fan of light may be projected perpendicular to the surface on which the device is mounted. Referring to FIG. 1, in this arrangement the fan of light is oriented perpendicular to the surface (the surface being coplanar with the page of the drawing) such that as the chassis 2 rotates about axle 4 (arrow A), the line of light (visible as shown by line 9) may be oriented at any angular position on the surface.

Figure 2:
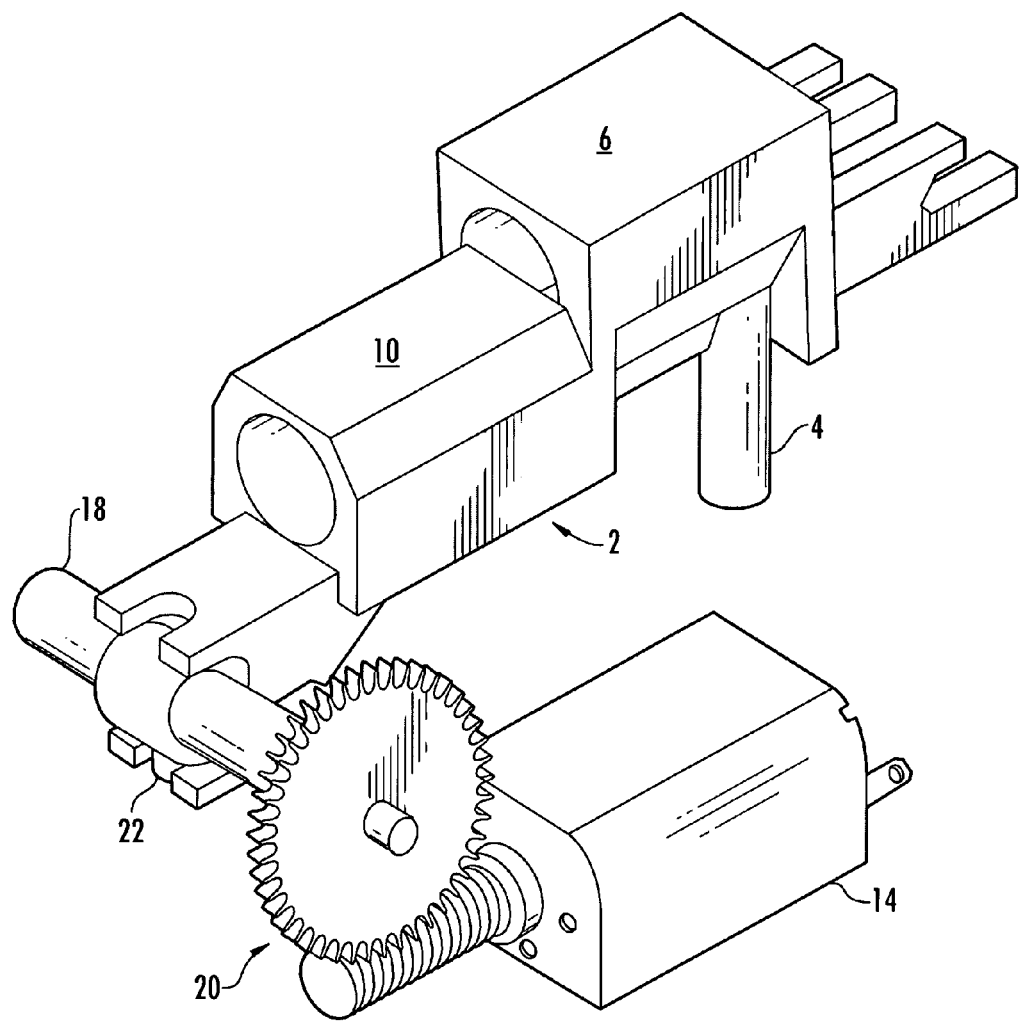
FIG. 2 is a perspective view of one embodiment of the laser module and drive assembly.

With the chassis 2 mounted on a substantially vertical surface such as a wall the inclinometer/accelerometer 8 senses the inclination of chassis 2 in the plane of the wall and a microprocessor 12 controls motor 14 through a motor control 16 to adjust the angular orientation of the chassis relative to the wall. Microprocessor 12 may be provided with internal or external memory as is known. Specifically, the output of inclinometer/accelerometer 8 is provided as an input to microprocessor 12. Microprocessor 12 compares the input from inclinometer/accelerometer 8 to a desired angular orientation and transmits a signal to motor control 16 to drive motor 14 to change the angular orientation of chassis 2. The microprocessor 12 monitors the output of inclinometer/accelerometer 8 and transmits a signal to motor control 16 to stop motor 14 when chassis 2 is in the desired position. In one embodiment, the drive motor 14 drives a screw 18 through a suitable gear reducer 20 (shown in FIG. 2) where screw 18 engages a floating nut 22 mounted to the chassis 2 as shown in FIG. 2. A power supply 24 such as a battery powers the components of the device.

Figure 3:
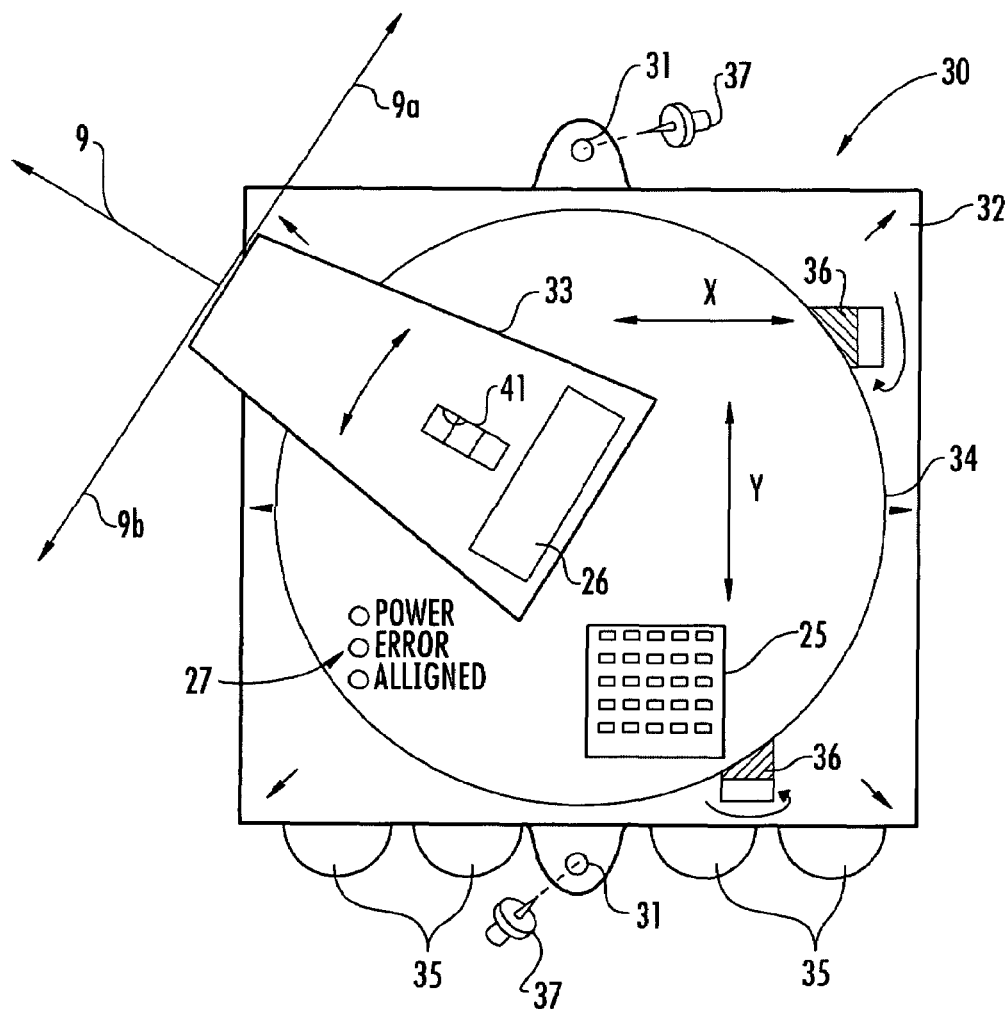
FIG. 3 is a plan view of an embodiment of the laser reference device of the invention.

Referring to FIG. 3, an electronic display 26 may be provided to present information to the user such as error messages, angular orientations, etc. Limit switches 19 may be used to limit the rotation of the chassis to within preset limits of angular rotation as shown in FIG. 1.

Programmed into microprocessor 12 are preset angular orientations or "snap angles" (e.g. 0°, 45°, 90°, 135°, 180°, etc.) that define predetermined angular orientations of the chassis 2 relative to horizontal or vertical. To operate the device, the user places the device on a wall using adhesive, pins, nails or other attachment mechanism in an orientation approximating the desired orientation and close to one of the preset orientations or snap angles. For example, if the desired orientation is level, the user mounts the device such that the beam would be approximately, but not necessarily exactly, level. The snap angles could be set at the factory or programmed by the user and conform to angular positions of the chassis 2. The inclinometer/accelerometer 8 electronically senses the actual angular orientation of the chassis 2 after it is mounted to the wall by the user. The microprocessor 12 compares the sensed actual angular orientation to the preset snap angles and automatically rotates the chassis to one of the precise preset snap angles. Any number of preset angles may be used.

Typically, the chassis 2 would be rotated to the preset snap angle closest to the sensed orientation. Each preset orientation or snap angle would have a range that the automatic rotation of the chassis can correct for. In one embodiment this would be a small angle, but the range could be up to one-half the angular distance between the snap angles (or +/−½ distance). For example, if there are snap angles preset at 0 and 45 degrees, the snap angle range would be less than +/−22.5 degrees. Thus if the user positions the chassis at 22 degrees, the device will automatically rotate the chassis to 0 degrees and if the user positions the chassis at 23 degrees the chassis will automatically rotate to 45 degrees. If smaller than the maximum ranges are used, the device automatically rotates to a preset angle provided the user positions the chassis within the range of a preset angle. For example, if the range is ±5 degrees the chassis will rotate to a preset angle provided the user orients the device within 5 degrees of that preset angle.

In one embodiment, if the device is placed on a wall outside of the snap angle ranges, it would be unable to self-adjust, and an error message would be displayed on electronic display 26. After self-aligning to the first snap angle the user could move the device to another position and the chassis would again precisely align the chassis to a second snap angle closest to the new position.

The elements described with reference to FIGS. 1 and 2 are incorporated in a wall mountable housing 30, shown in FIGS. 3 and 4. Housing 30 includes a reference surface 30a that may be attached to a wall or other substantially vertical surface 43 by adhesive strips 35 or pins 37 that engage apertures 31 or by other suitable attachment mechanisms. While the pins 37 are shown as separate components, the pins may be permanently movably mounted to the housing and biased to a retracted position by springs. The housing may consist of a base 32 that is attached to the wall or other substantially vertical surface where the base supports a turret 33 that includes the rotating chassis 2, laser module 6 and lens or reflector 10 such that a beam or plane of light 9 is projected therefrom. The housing 30 may further include an upper housing 34 between the base 32 and turret 33 where the upper housing 34 can move relative to the base 32 such that the laser line 9 could be aligned to external references after the laser self-aligns to the preset snap angle. For example, the upper housing 34 could be manually translatable relative to the base 32 in the x and y directions such that the position of the laser on the wall can be adjusted. In one embodiment the adjustment may be provided by manually adjustable knobs 36 that rotate screw drives 36a to translate the upper housing relative 34 to the base 32. In another embodiment the translational movement may be accomplished using a friction plate that allows the upper housing to slide relative to the base where friction holds the upper housing in the desired position.

The adjustable housing 30 also allows the user to physically rotate the chassis 2 and laser module 6 near to any other snap angle without having to remove the adhesive, pins or other attachment mechanism that holds the base 32 to the wall by allowing upper housing 34 to manually rotate relative to base 32. Once repositioned, the device would automatically align the laser to the new preset snap angle closest to the manually selected position.

In one embodiment, a line-generating lens 10 is used that creates three laser lines 9, 9a and 9b from two laser modules where the lines intersect on the mounting surface. There are several types of line generating lenses and/or reflectors that could be used to create light patterns such as a relatively simple reference surface line generator, a line generator with perpendicular wrap around, a line projector lens, a reflector creating a 360 degree plane of light or other laser line configurations. The device could generate beams, planes or combinations of beams and planes. The chassis 2 could also be mounted on a universal joint and it could be leveled around multiple axes. The snap angles may be set by the user or at the factory. The chassis 2 could also be allowed to rotate 360 degrees where the user could select any angle and the chassis would move to that point. The device could also include a user input (keypad) 25 where the user can input information such as user selectable snap angles, the desired final angular position of the laser or other user inputs to the microprocessor. The graphic display 26 and LED lights 27 provide information to the user.

Figure 4:
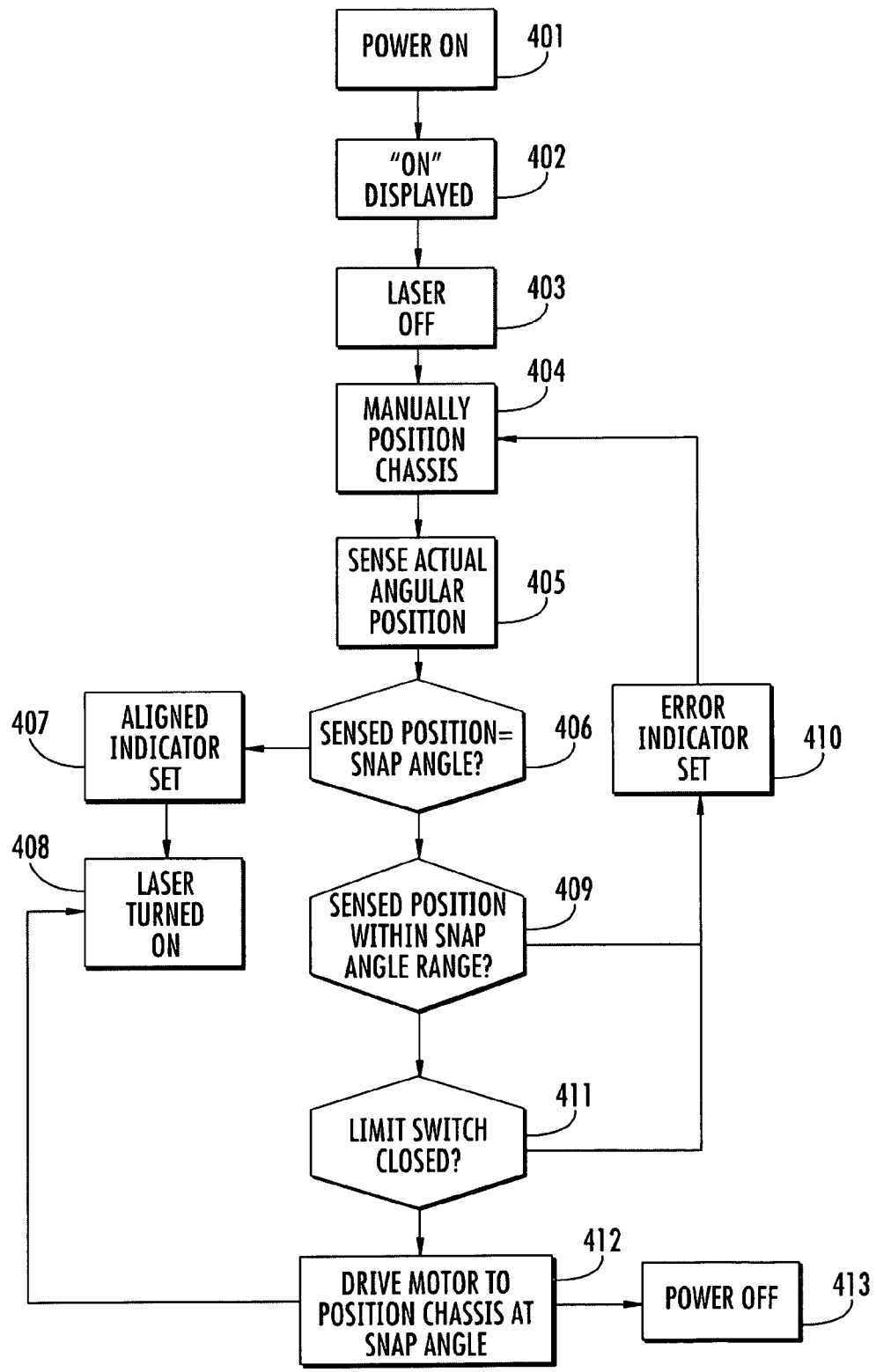
FIG. 4 is a flow diagram illustrating the operation of the laser reference device of the invention.
Figure 5:
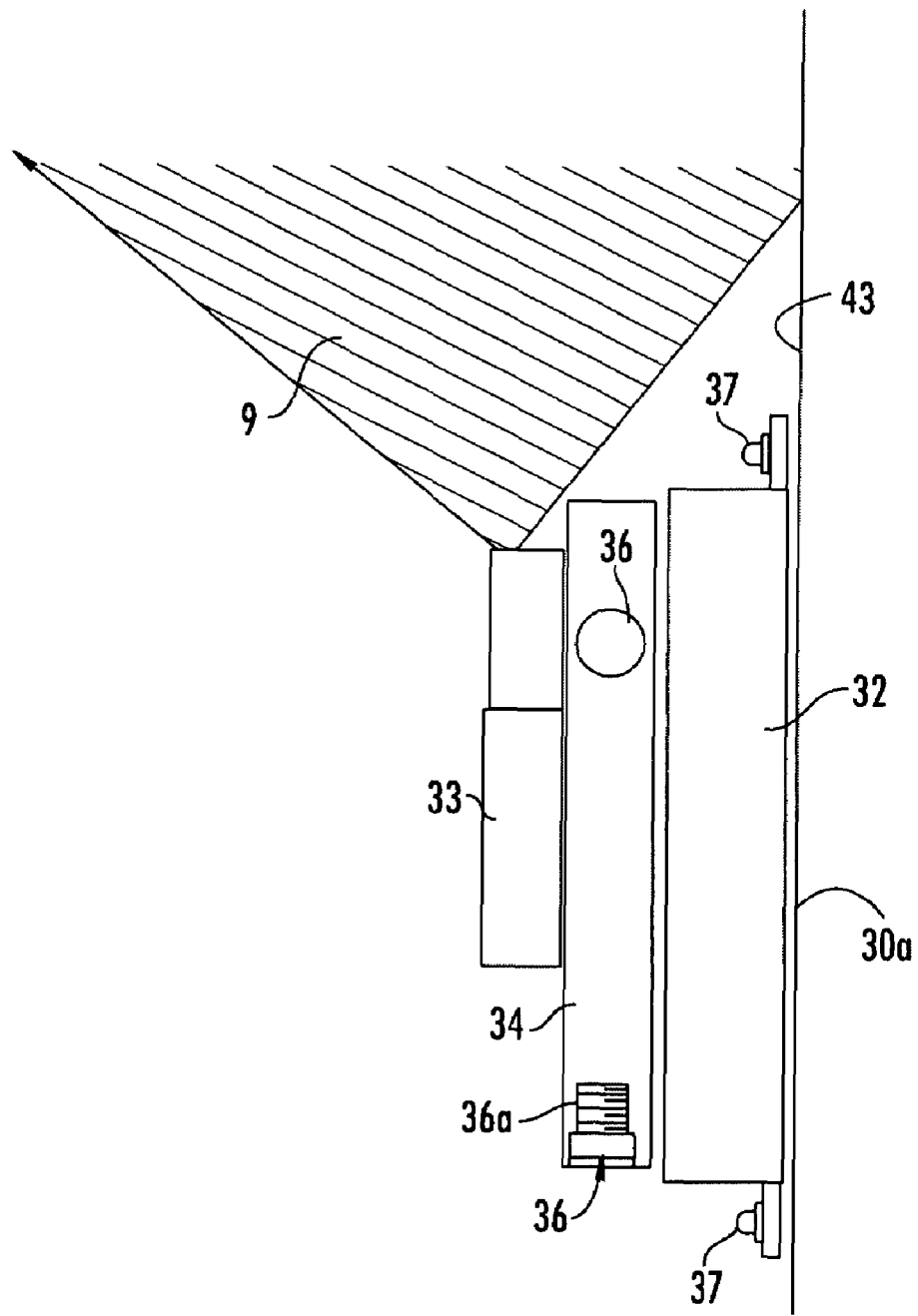
FIG. 5 is a side view of an embodiment of a laser reference device of the invention mounted on a vertical surface.

A block diagram showing the operation of the laser reference device of the invention is shown in FIG. 4. To initiate operation of the device, the device is powered up such as by turning on a power switch (block 401). The graphic display gives a visual indication to the user that the power is on such as by lighting "Power" LED (block 402). The laser at this point is not powered (block 403). The user manually rotates the chassis to a position close to the desired angular position and mounts the device to the surface in this position (block 404). To assist in this step, the housing may be provided with visual cues or indicators 39 as to the orientation of the device relative to level. The accelerometer/inclinometer 8 takes a reading of the actual angular orientation of the chassis (block 405). The reading is received by the microprocessor 12 and the microprocessor determines if the actual angular orientation matches a preset snap point (block 406). If the actual orientation matches a preset snap point angular orientation, an aligned indicator is set such as the lighting of an "Aligned" LED (block 407). Once aligned, the laser is powered either automatically or manually and a reference line, plane or point is generated for use by the end user (block 408). If the actual orientation does not match a preset snap point angular orientation (block 406), the microprocessor determines if the actual angular position is within the range of a preset snap point (block 409). If the actual angular position is not within a snap point range an error message is sent to the user such as by lighting an "Error" LED (block 410). If the actual angular position is within a snap point range, the microprocessor determines if a limit switch is closed (block 411). This is to ensure that while the actual position is within a preset range the chassis has sufficient rotary movement to align to the desired preset snap point. If a limit switch is closed, an "Error" message is delivered to the user (block 410). As previously described the limit switches may be eliminated and the chassis rotated 360 degrees. If a limit switch is not closed, the microprocessor 12 controls motor control 16 to drive the motor 14 to rotate the chassis 2 until the actual angular position of the device matches the nearest preset snap point (block 412). Once the chassis' actual angular orientation matches the preset snap point orientation, the "Aligned" message is given to the user (block 407) and the laser is powered on either automatically or manually (block 408). When the power switch is turned off (block 413), the device is powered down and the accelerometer/inclinometer is turned off. In one embodiment the device may be used with the automatic alignment functionality off where all alignment is done manually. To accommodate manual operation a level vial 41 may be provided on the housing to allow the user to manually align the device by visually reading the level vial.

The laser reference device of the invention is a flexible laser aligning device that can align to any angle quickly and accurately. Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A laser reference device comprising:
    a housing including a reference surface adapted to be mounted against a vertical surface;
    means for mounting the housing to said vertical surface;
    a chassis mounted for rotation relative to the housing;
    a collimated light source on the chassis;
    an inclination sensor that senses the angular orientation of the chassis; and
    a leveling mechanism including a motor for rotating the chassis from a first position to one of a plurality of second positions in response to the angular orientation sensed by the inclination sensor.

2. The device of claim 1 wherein said means for mounting comprises adhesive for mounting the housing to the surface.

3. The device of claim 1 wherein said means for mounting comprises a pin for mounting the housing to the surface.

4. The device of claim 1 wherein the light source projects a beam of light from the device.

5. The device of claim 1 wherein the light source projects a plane of light from the device.

6. The device of claim 5 wherein the plane of light is perpendicular to the reference surface.

7. The device of claim 1 wherein the one of the plurality of second positions comprises at least a preset angular orientation.

8. The device of claim 7 further including a plurality of the preset angular orientations.

9. The device of claim 1 wherein the motor is controlled by a microprocessor.

10. The device of claim 9 wherein the microprocessor controls the motor based on signals received from the inclination sensor.

11. The device of claim 1 wherein the one of a plurality of second positions is input by a user.

12. The device of claim 11 wherein the device includes a user input device for enabling user input of the second position.

13. The device of claim 1 further including a limit switch for limiting the rotation of the chassis.

14. The device of claim 1 further including a display for displaying information to a user.

15. A method of operating a laser reference device comprising:
    securing a chassis to a vertical surface, said chassis including means for generating a line of light on a reference surface;
    sensing the actual orientation of a line of light generated by said means for generating a line of light;
    determining if said actual orientation of a line of light generated by said means for generating a line of light matches one of a plurality of desired orientations;
    automatically reorienting said line of light generated by said means for generating a line of light to the one of the plurality of desired orientations using a motor; and
    projecting a line of light at said one of a plurality of desired orientations.

16. A laser reference device comprising:
    a housing including a reference surface adapted to be mounted against a vertical surface;
    means for mounting the housing to said vertical surface;
    a chassis mounted for rotation relative to the housing;
    a collimated light source on the chassis;
    an inclination sensor that senses an angular orientation of the light source and generates a signal in response to the angular orientation;
    a leveling mechanism including a motor for rotating the chassis from a first position to a second position wherein a microprocessor controls the motor based on the signal; and
    wherein the second position is input by the user.

17. The device of claim 16 wherein the second position is selected from one of a plurality of stored predetermined second positions.

18. A method of operating a laser reference device comprising:
    securing a chassis to a vertical surface, said chassis including means for generating a line of light on a reference surface;
    storing a plurality of preset orientation angles;
    sensing the actual orientation of a line of light generated by said means for generating a line of light;
    determining if said actual orientation of a line of light generated by said means for generating a line of light matches one of said plurality of preset orientation angles;
    automatically reorienting said line of light generated by said means for generating a line of light to the one of said plurality of preset orientation angles.

19. The method of claim 18 wherein the step of automatically reorienting said line of light to one of said plurality of preset orientation angles includes reorienting said line of light to the one of said plurality of preset orientation angles closest to the actual orientation.

* * * * *